US007925266B1

(12) United States Patent
Tran

(10) Patent No.: US 7,925,266 B1
(45) Date of Patent: Apr. 12, 2011

(54) METHOD FOR SELECTING WIRELESS TRANSMISSION SITE LOCATIONS

(75) Inventor: Thuy Thomas Tran, Fairfax, VA (US)

(73) Assignee: Nextel Communications Inc., Reston, VA (US)

(*) Notice: Subject to any disclaimer, the term of this patent is extended or adjusted under 35 U.S.C. 154(b) by 1032 days.

(21) Appl. No.: 11/455,162

(22) Filed: Jun. 15, 2006

(51) Int. Cl.
*H04W 40/00* (2009.01)

(52) U.S. Cl. .......................... 455/446; 455/448; 455/423

(58) Field of Classification Search .................. 455/446, 455/448, 423
See application file for complete search history.

(56) References Cited

U.S. PATENT DOCUMENTS

| 6,711,148 B1 * | 3/2004 | Hills ............................. 370/338 |
| 2006/0075131 A1 * | 4/2006 | Douglas et al. ............... 709/230 |
| 2006/0183487 A1 * | 8/2006 | Allen et al. ................. 455/456.5 |
| 2007/0066317 A1 * | 3/2007 | Amft et al. ..................... 455/446 |
| 2008/0062942 A1 * | 3/2008 | Hills et al. ..................... 370/338 |

* cited by examiner

*Primary Examiner* — Nghi H Ly
*Assistant Examiner* — Amancio Gonzalez

(57) ABSTRACT

The coverage radii for a number of wireless transmission stations is calculated based on one or both of a link budget analysis and a propagation model. At least one coverage gap may then be identified within a given coverage area of a communications network, and locations selected for new wireless transmission stations based on a location selection criteria. The previously-identified coverage gap information is updated to take into account the wireless coverage to be provided by the new wireless transmission station, after which additional passes of the coverage area may be performed to identify locations for additional new wireless transmission station based on both the location selection criteria and on the updated coverage gap.

20 Claims, 10 Drawing Sheets

METHOD FOR SELECTING WIRELESS TRANSMISSION SITE LOCATIONS

FIELD OF THE INVENTION

The present invention relates generally to the field of telecommunications, and in particular, to the process of selecting the locations for new wireless transmission sites given.

BACKGROUND OF THE INVENTION

In providing cellular telephone services, telecommunications providers are always interested in providing feature-rich, high-quality service using the least cost network deployment. Accordingly, there is a desire to constantly develop and deploy improved transmission technologies. Such technologies may include new transmission protocols, frequencies and/or features which often times need to be deployed across expansive geographic regions of the world.

Improving transmission technology can translate into changing the coverage radius of existing wireless transmission sites. The coverage radius of a given transmission site can even decrease after the deployment of the new technology, thereby creating coverage gaps within the communications network. For example, the adoption of a new network feature may result in a corresponding decrease in transmission range. Similarly, increasing the transmission frequency to provide higher bandwidth can result in lower transmission ranges.

Accordingly, there is a realization that some technological modifications to communication networks will result in a corresponding need to add additional transmission sites so as to maintain at least the same level of coverage. The problem presented is one of selection. Namely, the process of selecting where such new sites will be needed is currently a labour-intensive one, in which technicians engage in the manual process of essentially "eyeballing" locations that may experience a coverage gap. When the geographic area involved in this process spans cities and even counties, it can be a daunting process. As such, there is a need in the art for improving and even automating the process of selecting locations for new wireless transmission sites.

SUMMARY OF THE INVENTION

Methods for selecting one or more locations for new transmission stations are disclosed and claimed herein. In one embodiment, a method includes calculating coverage radii for each of a plurality of existing wireless transmission stations located across a coverage area of a wireless communication network, and identifying at least one coverage gap within a coverage area of the plurality of existing wireless transmission stations. The method further includes selecting a first location within the coverage gap for a first new wireless transmission station based on a location selection criteria, updating the coverage gap to take into account a coverage radius of the first new wireless transmission station, and selecting a second location for a second new wireless transmission station based on the location selection criteria and on the updated coverage gap.

Other aspects, features, and techniques of the invention will be apparent to one skilled in the relevant art in view of the following description of the exemplary embodiments of the invention.

DETAILED DESCRIPTION OF THE EXEMPLARY EMBODIMENTS

Figure 1:
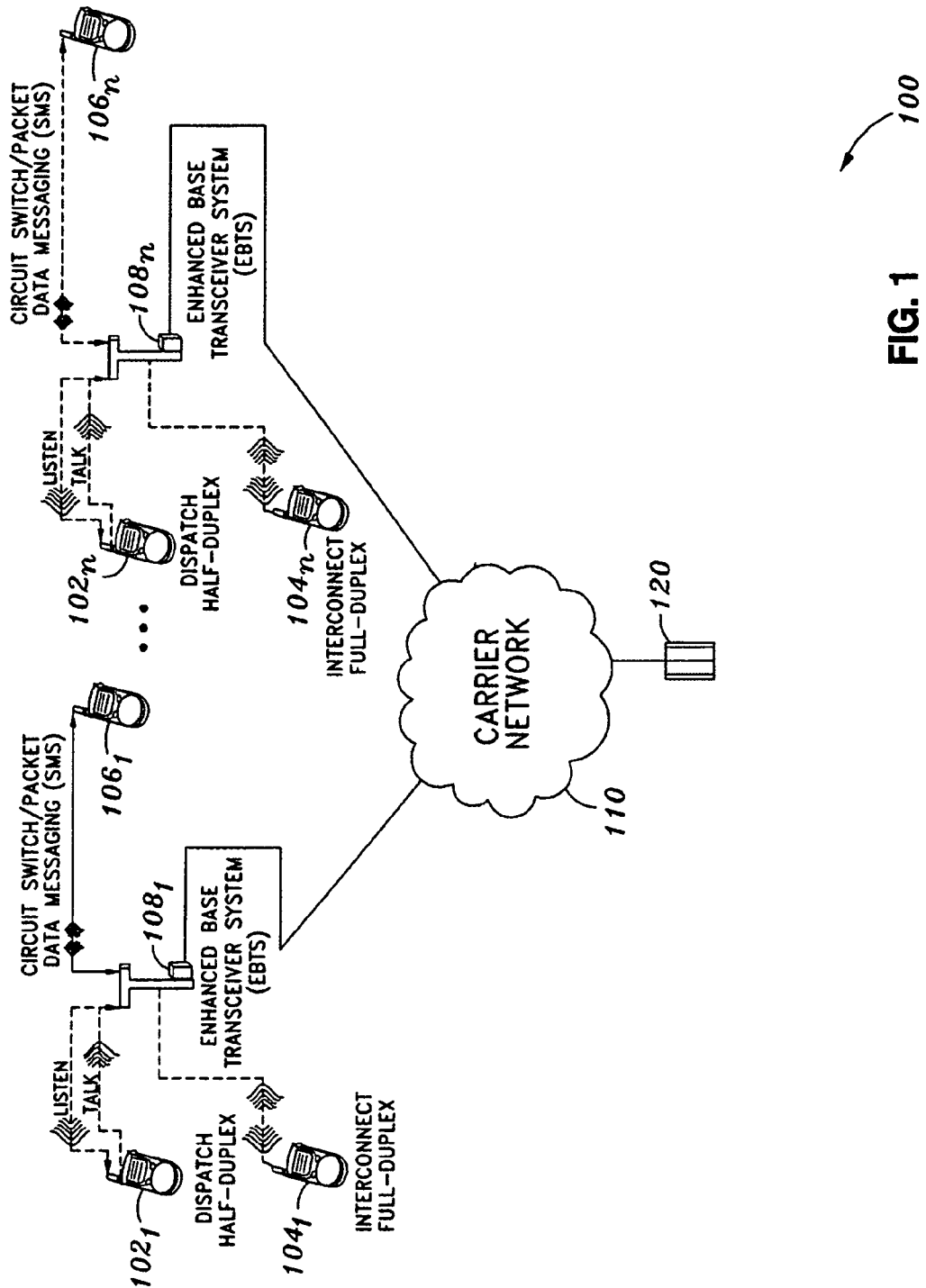
FIG. 1 illustrates an embodiment of a communication system capable of implementing one or more aspects of the invention.

Methods for selecting locations for new transmission stations are disclosed. In one aspect of the invention, the coverage radii for a number of wireless transmission stations is computed. In certain embodiments, the wireless transmission stations comprise at least a portion of a telecommunications network. In some embodiment, calculating the coverage radii is based on one or both of a link budget analysis and a propagation model for each of the wireless transmission stations. The link budget analysis may yield an updated link budget that is different than a previous link budget due to some network modification.

Another aspect of the invention is to identify at least one coverage gap within a given coverage area of a communications network, and to select locations therein for new wireless transmission stations based on a location selection criteria. In one embodiment, a coverage gap may exist when the sum of existing coverage radii for two adjacent transmissions sites is no greater than a separation distance between said two adjacent transmissions sites. Alternatively, a coverage gap may be deemed to exist when the sum of existing coverage radii for two adjacent transmissions sites does not exceed a separation distance between the two adjacent transmissions sites by at least some user-defined threshold.

In one embodiment, the location selection criteria is a midpoint of a coverage gap between two existing adjacent transmission sites. In another embodiment, the location selection criteria is to minimize coverage gaps between a new wireless transmission sites and at least one of the existing wireless transmission sites.

Still another aspect of the invention is to update the previously-identified coverage gap information to take into account the wireless coverage to be provided by the new wireless transmission station(s). Thereafter, a second pass of the coverage area of a communications network may be conducted to select locations for additional new wireless transmission station based on both the location selection criteria and on the updated coverage gap.

In accordance with the practices of persons skilled in the art of computer programming, the invention is described below with reference to operations that are performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

When implemented in software, the elements of the invention are essentially the code segments to perform the necessary tasks. The code segments can be stored in a processor readable storage medium. The "processor readable storage medium" may include any medium that can store information. Examples of the processor readable storage medium include an electronic circuit, a semiconductor memory device, a ROM, a flash memory or other non-volatile memory, a floppy diskette, a CD-ROM, an optical disk, a hard disk, etc.

Referring now to the figures, FIG. 1 illustrates a block diagram of an exemplary telecommunications system 100 in which one or more aspects of the invention may be implemented. In certain embodiments, the telecommunications system 100 is an iDEN system, such as the iDEN network owned and operated by Sprint Nextel, Inc. of Reston, Va. However, the telecommunication network of FIG. 1 may similarly be a Global System for Mobile (GSM) network, Code Division Multiple Access (CDMA) network, a Time Division Multiple Access (TDMA) network, a Wireless Broadband Packet Data Network, or a Public Switched Telephone Network (PSTN). As shown in FIG. 1, the telecommunications system 100 may serve a plurality of dispatch subscriber units $102_1$-$102_n$, a plurality of interconnect subscriber units $104_1$-$104_n$, and a plurality of SMS subscriber units $106_1$-$106_n$ (collectively, "subscriber units 102-106"), all of which may communicate with a plurality of transmission stations $108_1$-$108_n$. While the embodiment described herein is an iDEN network, it is readily understood that other known networks may be used; such as CDMA, GSM, etc. The subscriber units are the end-user interface to the telecommunications network 100. It should be appreciated that subscriber units 102-106 may be comprised of phones, pagers, modems, mobile transceivers, personal digital assistants, end-user base transceivers, or similar devices capable of communicating over the carrier network 110. Subscriber units 102-106 may be capable of dispatch calling, interconnect calling, roaming, message mail and/or data communications.

Transmission stations $108_1$-$108_n$ may be comprised of base station radios and control equipment contained in an Enhanced Base Transceiver System (EBTS). Such transmission sites may be used to provide the RF link between the carrier network 110 and the various subscriber units 102-106. Transmission sites may further provide connectively between subscriber units 102-106 and an external network 112. Wireless communication between transmission stations $108_1$-$108_n$ and subscriber units 102-106 occurs via encoded radio frequency (RF) channels which provide physical paths over which digital communication signals such as voice and data are transmitted. Each transmission station $108_1$-$108_n$ has a coverage radius which is a function of the sites link budget and propagation model, each of which will now be described.

While the details of calculating a transmission site's link budget are known in the art and beyond the scope of this disclosure, the term 'link budget' generally refers to the amount of transmitter power that will arrive at a far-end receiver. Power traveling across a wireless link will expand radially in all directions. The further the wireless power travels, the more it will spread out and the quicker the power level will decrease. Because wireless power spreads in all directions, it decreases logarithmically according to the "inverse-square" law. Some of the values used in calculating a site's link budget include transmission frequency, free space path loss, transmitter power, antenna gain, available bandwidth, receiver sensitivity, and path length.

Each transmission site will have a unique propagation model, as known in the art, that is dictated by the site's environment, including surrounding terrain, foliages and buildings. Additional factors include the height of the transmission site, the height of the receiver, and the carrier frequency. Commonly used propagation models include the Hata model and the Co-operative for Scientific and Technical research (COST)-231 model. Using one of these known models, path loss can be calculated for varying terrain, including rural, suburban and urban environments.

Using a link budget analysis and the path loss computed according to a propagation model, the coverage radius for a given transmission site can be readily computed.

Figure 2:
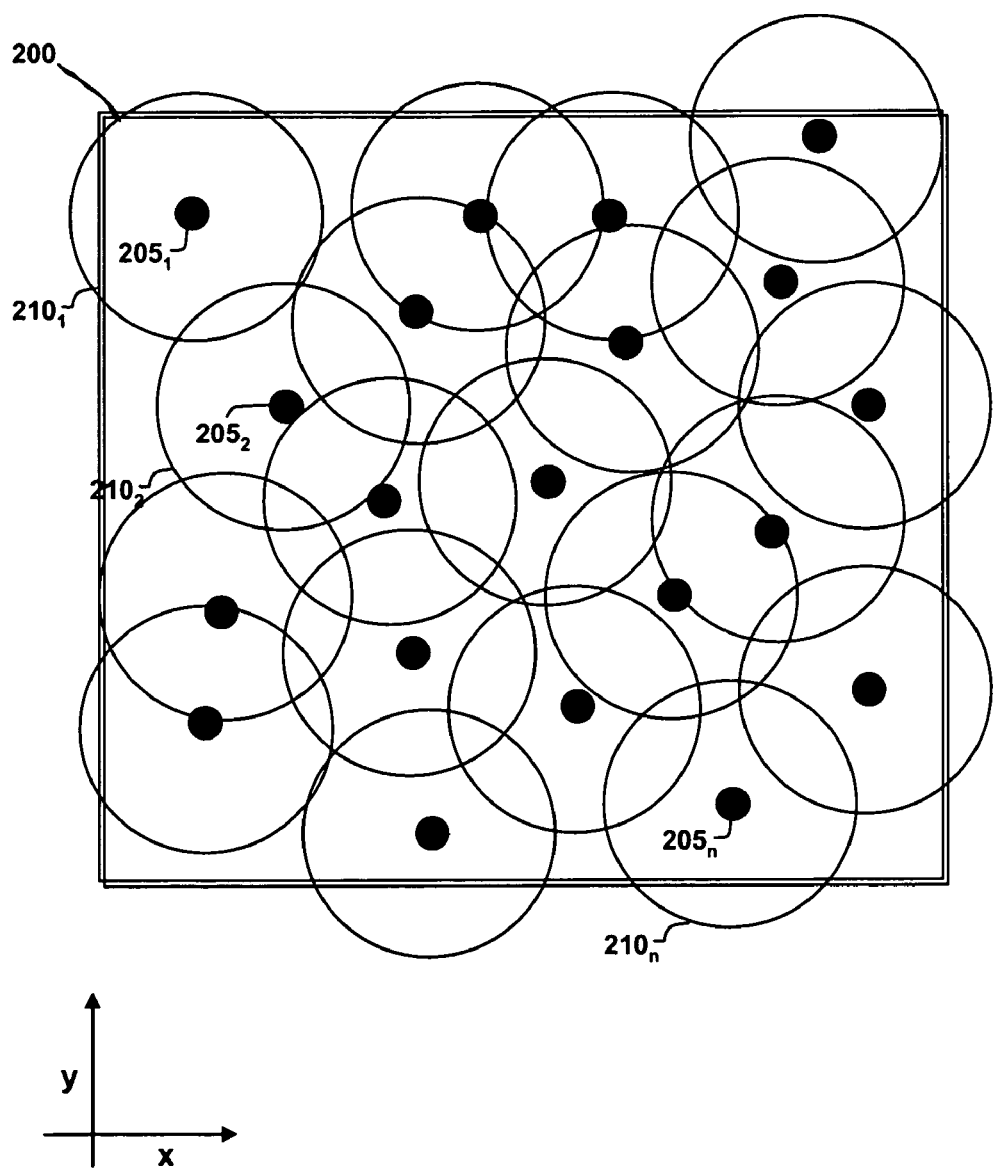
FIG. 2 illustrates a coverage grid of an existing wireless network comprised of a plurality of wireless transmission stations.

Referring now to FIG. 2, depicted is a wireless coverage area 200 of a communications network (e.g., telecommunications system 100) comprised of a plurality of wireless transmission stations $205_1$-$205_n$ that provide wireless coverage across virtually of the depicted coverage area 200. For clarity, not all of the transmission stations $205_1$-$205_n$ have been labeled, but all are depicted as solid black circles having corresponding surrounding coverage areas. Each transmission station is further depicted as having a corresponding coverage radius $210_1$-$210_n$. In one embodiment, the link budget and propagation model for a given transmission station will determine its coverage radius. Moreover, the coverage radii $210_1$-$210_n$ of adjacent stations will typically overlap by some user-defined threshold so as to minimize coverage gaps.

Figure 3A:
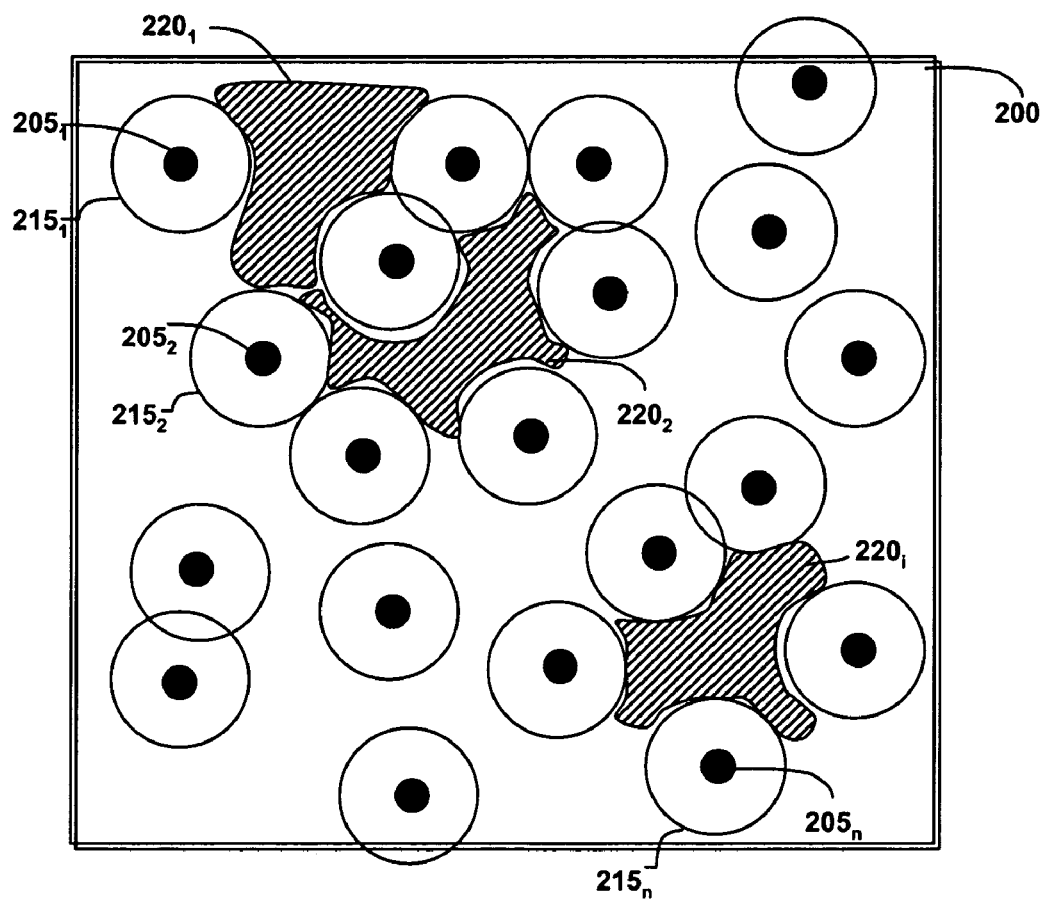
FIGS. 3A-3C illustrate embodiments of coverage grids for a new overlay network based on one or more changes to the existing wireless network of FIG. 2.

FIG. 3A depicts another embodiment of the wireless coverage area 200 after some coverage-altering change has been implemented. As previously mentioned, some technological improvements can materially affect the existing coverage map, including decreasing the coverage radii for individual transmission stations. For example, implementation of new transmission protocols, transmission frequency and/or power changes may all result in a corresponding change to the stations' link budgets and therefore their coverage radii. To that end, FIG. 3A depicts the transmission stations $205_1$-$205_n$ of FIG. 2 after such a change has been made, with the corresponding coverage radii $215_1$-$215_n$ being reduced in half for this example. Obviously, the amount of coverage reduction experienced by a given transmission station will depend on the nature of the change made. The reduction depicted in FIG. 3A is merely one example. In addition, the coverage radius for a given transmission station or group of transmission stations after the network change may be computed using the newly-applicable link budgets and propagation models.

Continuing to refer to FIG. 3A, the reduction in the coverage radii $215_1$-$215_n$ means that there will be a number of coverage gaps $220_1$-$220_i$ across the wireless coverage area 200. As such, it will become desirable to selectively locate new transmission sites to remedy the coverage-reduction effect of whatever change was made to the network. While in one embodiment, the coverage-affecting change will affect station link budgets, it should be appreciated that the propagation model applicable to a given transmission station may or may not experience a corresponding change. In any event, by simply supplying the changed parameter (e.g., frequency, transmission power, etc.), the new coverage radii $215_1$-$215_n$ can be automatically computed.

Figure 3B:
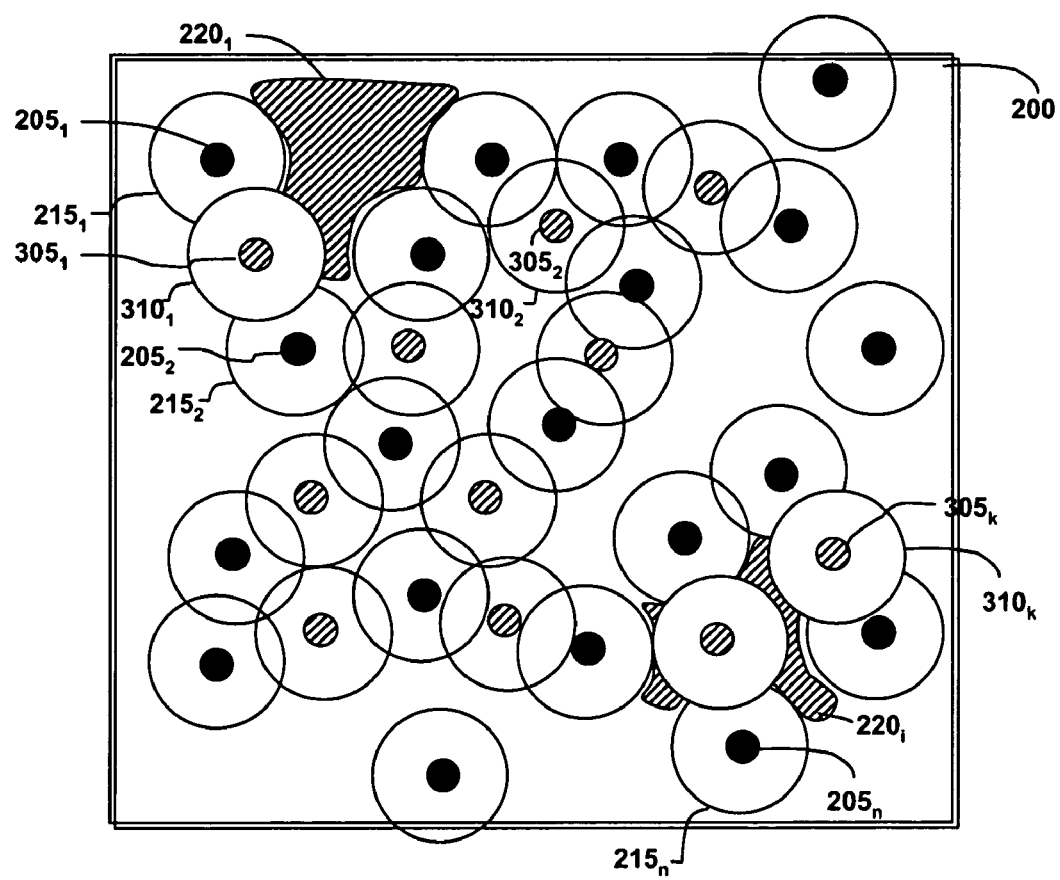

To that end, FIG. 3B depicts the wireless coverage area 200 in which locations for a plurality of new transmission sites $305_1$-$305_k$ are being selected within the area 200 in order to fill a number of coverage gaps $220_1$-$220_k$ caused, for example, by a coverage-affecting network change. For clarity, not all of the new transmission stations $305_1$-$305_k$ have been labeled, but all are depicted with cross-hatched circles, as shown in FIG. 3B. In contrast, existing transmission stations $205_1$-$205_n$ are depicted as solid black circles.

Figure 5A:
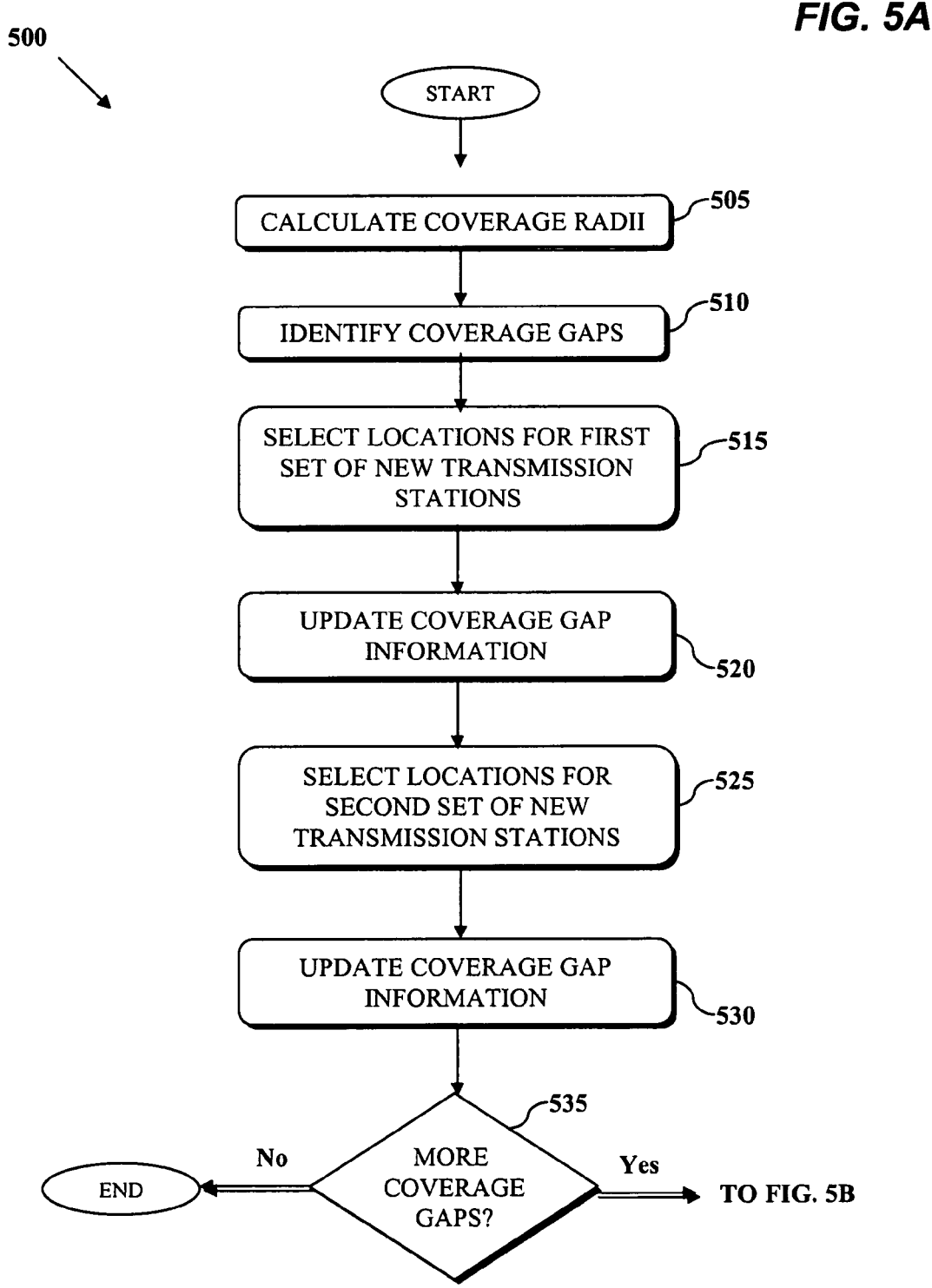
FIGS. 5A-5B illustrate one embodiment of a process for carrying out certain aspects of the invention.

As will be described in more detail below with reference to FIGS. 5A-5B, the location selection process for new transmission site $305_1$-$305_k$ may be done on an iterative basis with additional locations for new transmission sites being selected with each pass over the coverage area 200.

In the embodiment of FIG. 3B, the location selection process for the new transmission site $305_1$-$305_k$ may be based on a determination of whether the sum of the coverage radii for two adjacent transmissions sites is less than their separation distance. Alternatively, the selected location for a new transmission site may be based on a determination that the sum of the coverage radii for two adjacent transmissions sites does not exceed their separation distance by at least some user defined threshold. For example, in FIG. 3B the distance between transmission site $205_1$ and transmission site $205_2$ clearly exceeds the sum of coverage radius $215_1$ and coverage radius $215_2$. As such, a new transmission site $305_1$ having coverage radius $310_1$ is selectively located between transmission sites $205_1$ and $205_2$, as shown in FIG. 3B. As shown, the coverage gap $220_1$ has been at least partially reduced by the new transmission site $305_1$. In one embodiment, the location chosen for the new transmission site $305_1$ may be the midpoint of the coverage gap between two adjacent transmission sites (e.g., transmission sites $205_1$ and $205_2$). In another embodiment, a coverage gap between adjacent transmission sites (e.g., transmission sites $205_1$ and $205_2$) may be considered filled only if the coverage radius for the new transmission site (coverage radius $310_1$) overlaps the existing coverage radii (e.g., coverage radii $215_1$ and $215_2$) for the two adjacent transmission sites by at least some user-defined threshold.

As previously mentioned, the process of selectively locating new transmission sites may be recursive in nature. That is, a first pass of the coverage area 200 may be undertaken to determine the location(s) for one or more new transmission site. For example, FIG. 3B shows network 300 after a first pass has been completed and the various coverage gaps $220_1$-$200_i$ at least partially covered by the new transmission sites new transmission sites $305_1$-$305_k$. However, there are clearly additional coverage gaps which have not been filled and, as such, additional passes to locate additional new transmission sites may be needed.

Figure 3C:
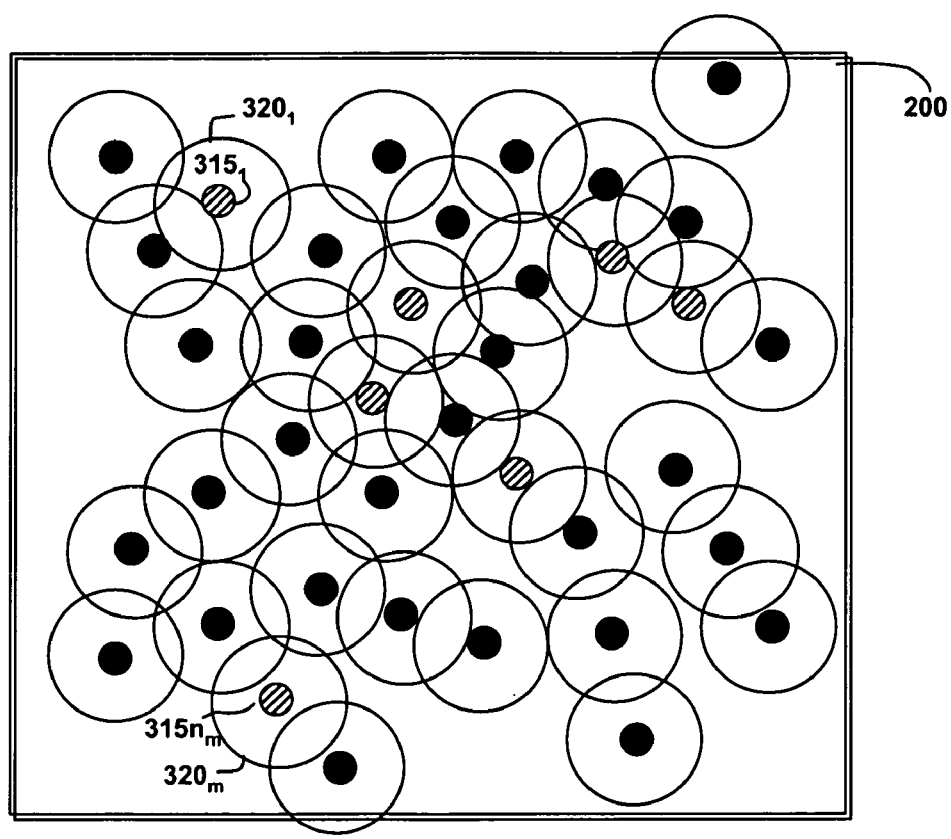

To that end, FIG. 3C depicts the wireless coverage area 200 after a second pass of the new transmission site selection process has been completed, according to one embodiment. In this embodiment, the second pass has yielded site locations for new transmission stations $315_1$-$315_m$ having corresponding coverage radii $320_1$ and $320_m$. Again, for clarity not all of the new transmission sites $315_1$-$315_m$ have been labeled, but all are depicted with cross-hatched circles. Moreover, existing transmission stations $205_1$-$205_n$, as well as the new transmission site locations from previous passes (e.g., transmission sites $305_1$-$305_k$) are depicted as solid black circles to distinguish them from new transmission site locations resulting from the current pass. In this fashion, network coverage gaps may be filled on a recursive basis by performing the new site selection process on an iterative basis. As will be described in more detail below with reference to FIGS. 5A-5B the new site selection process may terminate when all coverage gaps have been filled.

Figure 4A:
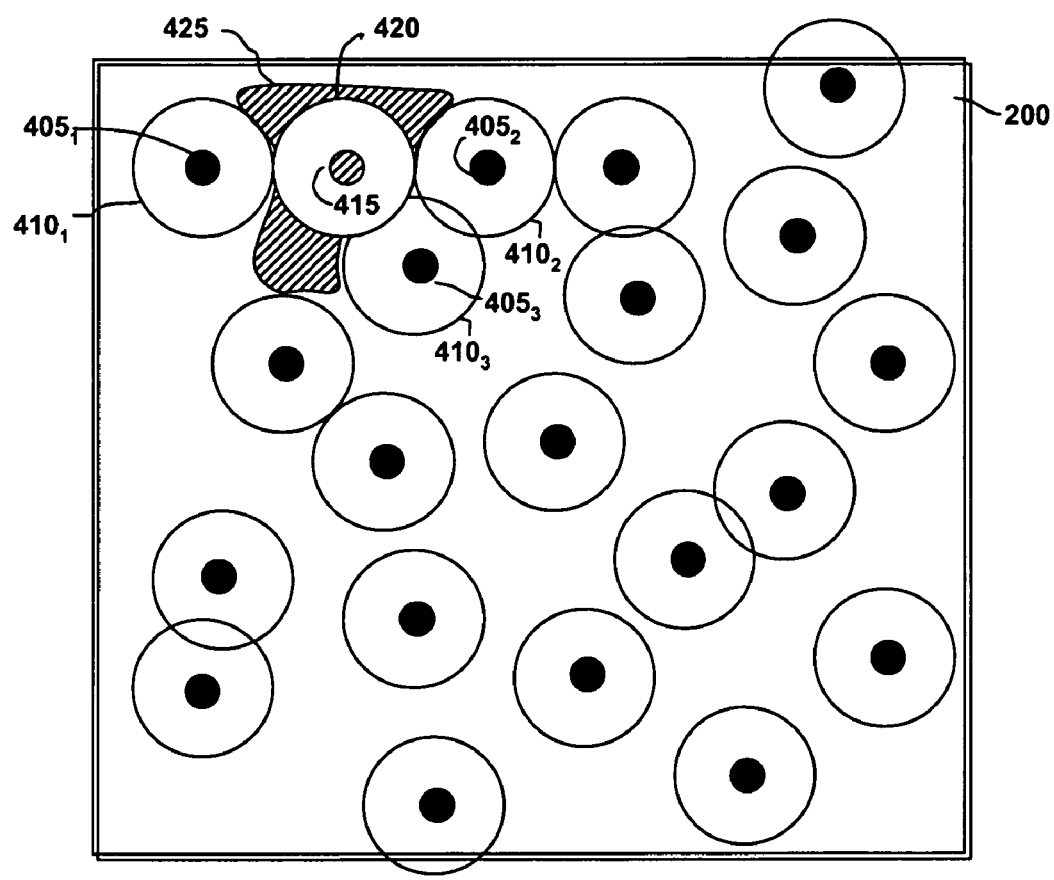
FIGS. 4A-4C illustrate additional embodiments of coverage grids for a new overlay network based on one or more changes to the existing wireless network of FIG. 2.

Referring now to FIG. 4A, depicted is one embodiment of a aforementioned wireless coverage area 200 in which a first pass of the site selection process has yielded a location for a new site 415 as being the midpoint of a coverage gap between two existing adjacent transmission sites $405_1$ and $405_2$. In this embodiment, adjacent transmissions sites $405_1$, $405_2$ and $405_3$ having coverage radii $410_1$, $410_2$ and $410_3$ respectively, and are separated by a coverage gap 425. A midpoint calculation would yield the new site location depicted in FIG. 4A. However, with this approach the coverage radius 420 for the new transmission site 415 may not necessarily overlap the adjacent coverage radii $410_1$, $410_2$ and $410_3$ by at least the user-defined threshold. While in this example there is an overlap between new coverage radius 420 and existing coverage radius $410_3$, there is no such overlap between radius 420, on the one hand, and $410_1$ and $410_2$, on the other hand. As a result, a second pass of the site selection process would actually call for placing a new transmission site between sites $405_1$ and 415, as well as another site between 415 and $405_2$. This excessive coverage may lead to network inefficiencies and be undesirable in some cases. As such, it may be preferable to employ a more intelligent location selection criteria than just using the midpoint.

Figure 4B:
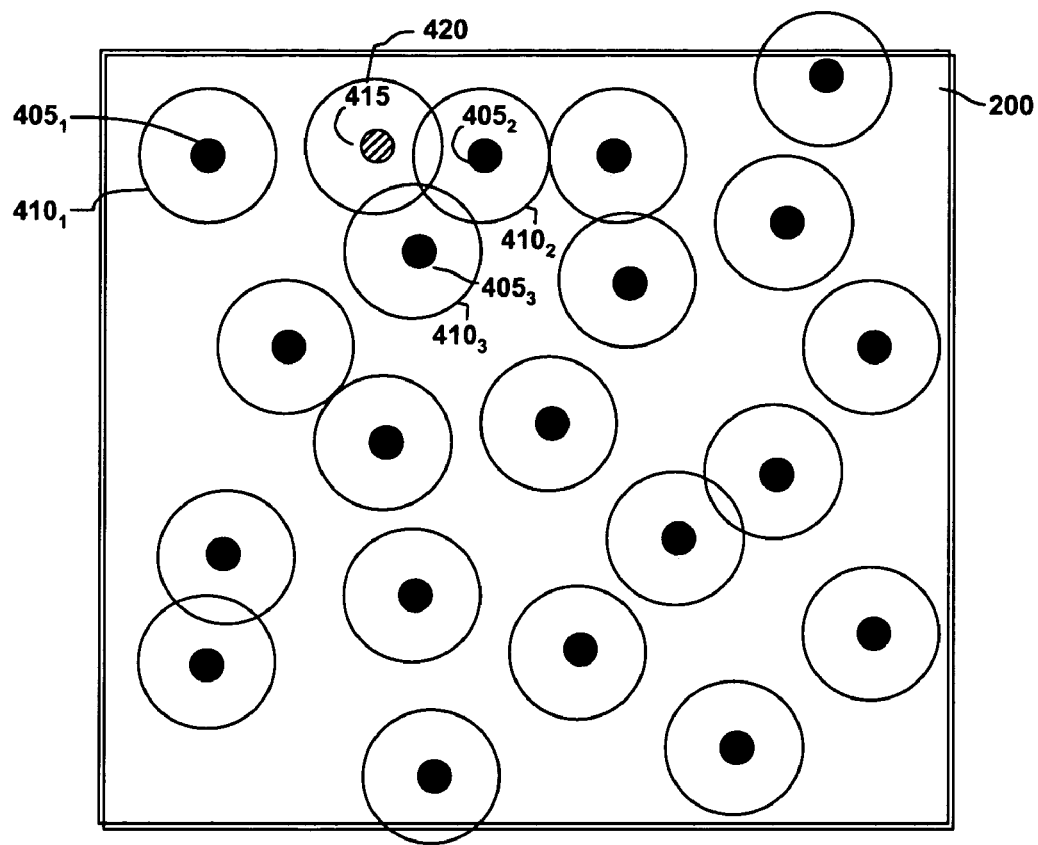

To that end, FIG. 4B depicts one embodiment in which an intelligent location selection criteria is used to locate new transmission site 415. As shown, a first pass of the new transmission site location process has yielded the location for new transmission site 415 shown in FIG. 4B. In this embodiment, coverage overlap is provided between the newly added coverage radii 420 and two other coverage radii—coverage radii $410_2$ and $410_3$, as shown. Thus, in this embodiment, the location for new transmission site 415 is based on minimizing coverage gaps, as opposed to midpoint calculations. In addition, minimizing coverage gaps between the new site and the existing sites may include providing coverage overlap in an amount at least equal to a user-defined threshold. While only one new site location is depicted in FIG. 4B, it should of course be appreciated that numerous additional transmission site locations may be determined using the aforementioned intelligent selection criteria across the rest of the coverage area 200.

Figure 4C:
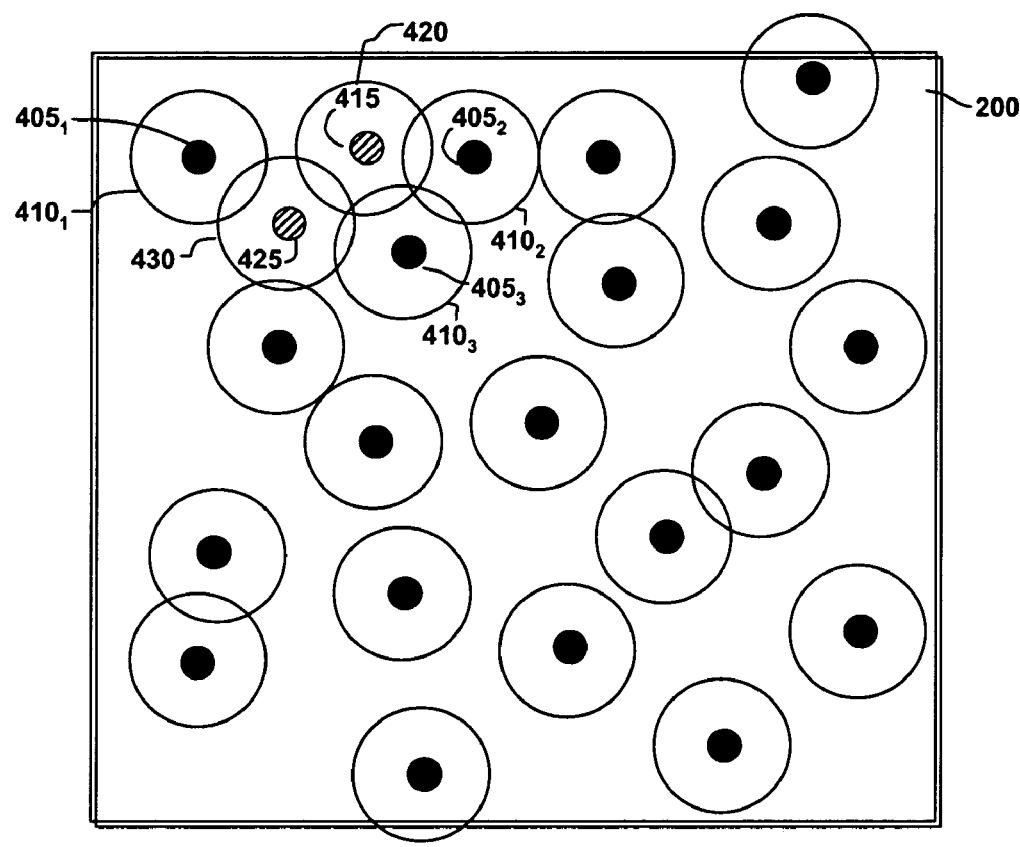

FIG. 4C depicts the coverage area 200 of FIG. 4B after a second pass using an intelligence location selection criteria has determined the location for a new transmission site 425 having a coverage radius of 430. While only the upper left corner of network 400 is being described here, in another embodiment each pass of the new site location process may generate new site locations throughout the coverage area 200 so as to fill the various coverage gaps therein.

Continuing to refer to FIG. 4C, is should be noted that the second pass has yielded a location for new site 425 which minimizes the coverage gap between the new site 425 and the previously added new site 415, as well as between the new site 425 and the existing sites $405_1$ and $405_3$. Moreover, coverage overlap in an amount at least equal to a user-defined threshold is provided between the new site 425, on the one hand, and transmission sites 415, $405_1$ and $405_3$ on the other hand. In this fashion, a new transmission sites may be efficient located across a given area of a communication network which minimizes coverage gaps while also minimizing the number of new transmission sites needed to achieve a particular level of wireless coverage.

FIG. 5 is a process 500 for selecting locations for new wireless transmission sites in accordance with one embodiment. In one embodiment, process 500 may be used to fill coverage gaps in a predetermined coverage area (e.g., coverage area 200) of a wireless communications network (e.g., telecommunications network 100) that is the result of some coverage-altering modification made to the wireless network. Process 500 begins at block 505 with the calculation of the coverage radii for the wireless transmission stations (e.g., transmission stations $108_1$-$108_n$) which comprise at least a portion of a communications network. In one embodiment, this may be accomplished using a link budget analysis and path loss computed according to a propagation model for each of the transmission stations in question. In some embodiments it may be necessary to also consider the sensitivity of the wireless receivers (e.g., subscriber units 102-106) that will be communicating with the transmission stations.

At block 510, one or more coverage gaps within the predetermined coverage area of the wireless network may be identified. In one embodiment, a coverage gap may exist wherever the sum of the coverage radii for two adjacent transmissions sites is less than their separation distance. Alternatively, the coverage gap may exist when the sum of the coverage radii for two adjacent transmissions sites does not exceed their separation distance by at least some user defined threshold.

Once the coverage gaps have been identified above in block 510, process 500 may continue to block 515 where locations for a first set of new transmission sites may be selected. In one embodiment, this selection step comprises performing an initial pass across the relevant coverage area in which new transmission site locations are selectively located so as to minimize the previously identified coverage gaps from block 510. In one embodiment, the selection process of block 515 is based on a location selection criteria. In one embodiment, the location selection criteria may involve calculating a midpoint of a coverage gap between two existing adjacent transmission sites, and using this point as the location for a new transmission site. Alternatively, the location selection criteria may be some intelligent criteria, such as minimizing coverage gaps between a new transmission site and existing sites. In one embodiment, minimizing coverage gaps may include satisfying a user-defined threshold of coverage overlap between the proposed new transmission site and the existing transmission sites.

After the first set of new transmission site location from the initial pass have been selected, process 500 continues to block 520 where the previously-identified coverage gaps are updated to reflect the additional wireless coverage to be provided by the new wireless transmission sites located at the selected new transmissions site locations. Process 500 may then continue to block 525 where a second set of new transmission station locations may be selected. Based on the updated coverage gap information from block 525, the selection process of block 525 may comprise performing a second pass across the network area in question taking into account the updated coverage information. As with block 515, the selection operation of block 525 may be based on a location selection criteria, which in one embodiment may similarly involve calculating a midpoint of a coverage gap between two existing adjacent transmission sites, and using this point as the location for a new transmission site. However, unlike the operation of block 515, the selection operation of block 525 may take into account coverage gaps between two existing adjacent transmission sites, or alternatively between one existing transmission site and a selected location for a new transmission site, or between selected locations for two new transmissions sites. Alternatively, the location selection criteria may be an intelligent criteria which, for example, minimizing coverage gaps while also minimizing the number of new transmission site locations. In one embodiment, minimizing coverage gaps may include satisfying a user-defined threshold of coverage overlap between the proposed new transmission site and existing or previously-selected transmission site locations.

Following the location selection for the second set of new transmissions, process 500 continues to block 530 where the coverage gap information may again be updated to reflect the additional wireless coverage to be provided by both the first set and second set of new wireless transmission sites located at the selected new transmissions site locations.

At this point, process 500 continues to block 535 where a determination may be made as to whether there are any additional coverage gaps across the relevant portion of the wireless communication network. As previously discussed, a coverage gap may exist wherever the sum of the coverage radii for two adjacent transmissions sites is less than their separation distance. Alternatively, a coverage gap may exist when the sum of the coverage radii for two adjacent transmissions sites does not exceed their separation distance by at least some user defined threshold. If a determination is made at block 535 that there are no more coverage gaps, then the process 500 ends. If, on the other hand, there are addition coverage gaps to fill, process 500 may continue to block 540 of FIG. 5B. In one embodiment, a determination that there are no more coverage gaps to fill may be based on achieving some predetermined level of coverage (e.g., 95%, 90%, 85%, etc.) across the coverage area in question.

Figure 5B:
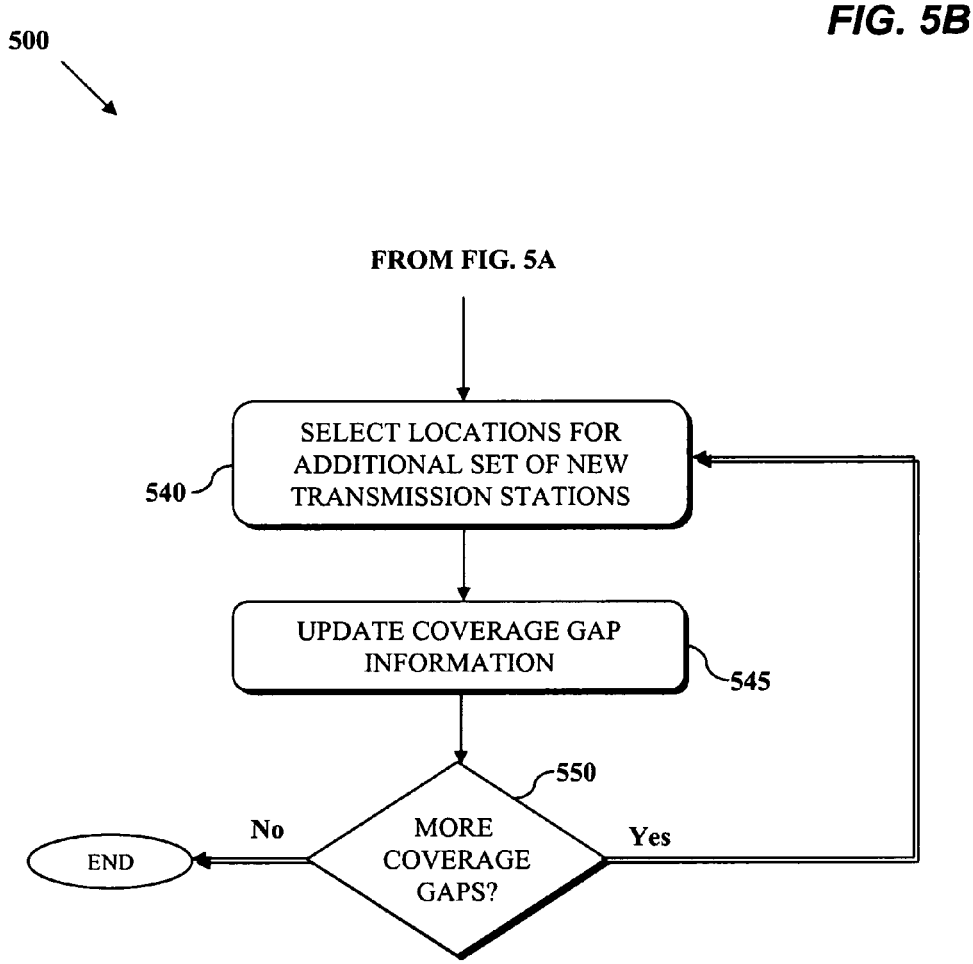

At block 540 of FIG. 5B, another pass of the relevant network area may be conducted to determine where additional new transmission sites should be located. This operation may be carried out in the same manner described above with reference to block 525 in which the updated coverage gap information is used to perform another pass of the network area selecting additional locations for new transmissions sites, while taking into account the updated coverage information.

Thereafter, at block 545 the coverage gap information is again updated, as was done above with reference to block 530. Thereafter, as was done above at block 535, a determination may be made at block 550 as to whether there are any additional coverage gaps across the relevant portion of the wireless communication network. If it is determined that there are no more coverage gaps, then the process 500 ends. If, on the other hand, there are addition coverage gaps to fill, process 500 may loop back to block 540 and repeat the operations of blocks 540-550 until such time as a desired level of coverage has been achieved (e.g., 95%, 90%, 85%, etc.).

The disclosed embodiments are illustrative of the various ways in which the present invention may be practiced. Other embodiments can be implemented by those skilled in the art without departing from the spirit and scope of the present invention. For example, while process 500 has been described in the above embodiments, the order of one or more of the acts of process 500 may be changed while still conforming to the principles of the invention.

What is claimed is:

1. A method for selecting new wireless transmission station locations, comprising the acts of:
   calculating coverage radii for each of a plurality of existing wireless transmission stations physically located across an existing coverage area of a wireless communication network following a coverage-reducing technological modification to the plurality of existing wireless transmission stations;
   identifying at least one existing coverage gap within the existing coverage area of the plurality of existing wireless transmission stations resulting from the coverage-reducing technological modification to the plurality of existing wireless transmission stations;
   performing a first pass of the existing coverage area by selecting a first plurality of locations within the existing coverage gaps for a first set of new wireless transmission stations based on a location selection criteria;
   updating said existing coverage gap to reflect an updated coverage gap by taking into account expected coverage radii of the first set of new wireless transmission stations; and performing a second pass of the existing coverage area by selecting a second plurality of locations for a second set of new wireless transmission stations based on the location selection criteria and on the updated coverage gap.

2. The method of claim 1, wherein calculating comprises calculating a link budget for each of the plurality of existing wireless transmission stations.

3. The method of claim 2, wherein said link budget is an updated link budget that is different than a previous link budget due to a network modification.

4. The method of claim 1, wherein the plurality of existing transmission stations are base stations serving an existing telecommunications network.

5. The method of claim 1, wherein performing the second pass of the entire existing coverage area comprises performing the second pass of the entire existing coverage area by selecting the second plurality of locations such that the second new set of wireless transmission stations is able to provide coverage across at least a portion of the updated coverage gap.

6. The method of claim 1, wherein identifying at least one existing coverage gap comprising identifying at least one existing coverage gap when the sum of existing coverage radii for two adjacent transmissions sites is no greater than a separation distance between said two adjacent transmissions sites.

7. The method of claim 1, wherein identifying at least one existing coverage gap comprising identifying at least one existing coverage gap when the sum of existing coverage radii for two adjacent transmissions sites does not exceed a separation distance between the two adjacent transmissions sites by at least some user-defined threshold.

8. The method of claim 1, wherein the location selection criteria is a midpoint of an existing coverage gap between two existing adjacent transmission sites.

9. The method of claim 1, wherein the location selection criteria is minimizing coverage gaps between at least one of the first and second new wireless transmission sites and at least one of the plurality of existing wireless transmission sites.

10. The method of claim 1, wherein the location selection criteria is minimizing a total number of new wireless transmission sites needed to provide at least a predetermined level of coverage across the existing coverage area of the wireless communication network.

11. A computer program product, comprising:
a computer readable storage medium having computer executable program code embodied therein to select new wireless transmission station locations across an existing coverage area of a wireless communications network, the computer executable program code in said computer program product comprising:
computer executable program code to calculate coverage radii for each of a plurality of existing wireless transmission stations physically located across an existing coverage area of the wireless communication network following a coverage-reducing technological modification to the plurality of existing wireless transmission stations;
computer executable program code to identify at least one existing coverage gap within the existing coverage area of the plurality of existing wireless transmission stations resulting from the coverage-reducing technological modification to the plurality of existing wireless transmission stations;
computer executable program code to perform a first pass of the existing coverage area by selecting a first plurality of locations within the existing coverage gaps for a first set of new wireless transmission stations based on a location selection criteria;
computer executable program code to update said existing coverage gap to reflect an updated coverage gap by taking into account an expected coverage radius of the first new set of wireless transmission stations; and
computer executable program code to perform a second pass of the existing coverage area by selecting a second plurality of locations for a second new set of wireless transmission stations based on the location selection criteria and on the updated coverage gap.

12. The computer program product of claim 11, wherein the computer executable program code to calculate comprises computer executable program code to calculate a link budget for each of the plurality of wireless transmission stations.

13. The computer program product of claim 12, wherein said link budget is an updated link budget that is different than a previous link budget due to a network modification.

14. The computer program product of claim 11, wherein the plurality of existing transmission stations are base stations serving an existing telecommunications network.

15. The computer program product of claim 11, wherein the computer executable program code to perform the second pass of the entire existing coverage area comprises computer executable program code to perform the second pass of the entire existing coverage area by selecting the second plurality of locations such that the second new set of wireless transmission stations is able to provide coverage across at least a portion of the updated coverage gap.

16. The computer program product of claim 11, wherein the computer executable program code to identify at least one existing coverage gap comprises computer executable program code to identify at least one existing coverage gap when the sum of existing coverage radii for two adjacent transmissions sites is no greater than a separation distance between said two adjacent transmissions sites.

17. The computer program product of claim 11, wherein the computer executable program code to identify at least one existing coverage gap comprises computer executable program code to identify at least one existing coverage gap when the sum of existing coverage radii for two adjacent transmissions sites does not exceed a separation distance between the two adjacent transmissions sites by at least some user-defined threshold.

18. The computer program product of claim 11, wherein the location selection criteria is a midpoint of an existing coverage gap between two existing adjacent transmission sites.

19. The computer program product of claim 11, wherein the location selection criteria is minimizing coverage gaps between at least one of the first and second new wireless transmission sites and at least one of the plurality of existing wireless transmission sites.

20. The computer program product of claim 11, wherein the location selection criteria is minimizing a total number of new wireless transmission sites needed to provide at least a predetermined level of coverage across the existing coverage area of the wireless communication network.

* * * * *